United States Patent
Queck et al.

(10) Patent No.: US 8,510,806 B2
(45) Date of Patent: Aug. 13, 2013

(54) SYSTEM AND METHOD OF CONTROLLING ACCESS TO INFORMATION IN A VIRTUAL COMPUTING ENVIRONMENT

(75) Inventors: Tobias Queck, Mountain View, CA (US); Sebastian Steinhauer, Mountain View, CA (US)

(73) Assignee: SAP AG, Walldorf, DE (US)

( * ) Notice: Subject to any disclaimer, the term of this patent is extended or adjusted under 35 U.S.C. 154(b) by 528 days.

(21) Appl. No.: 12/604,170

(22) Filed: Oct. 22, 2009

(65) Prior Publication Data

US 2011/0099608 A1    Apr. 28, 2011

(51) Int. Cl.
*G06F 17/30*    (2006.01)

(52) U.S. Cl.
USPC ........ 726/4; 726/26; 726/29; 713/2; 713/193; 711/156; 711/100; 434/107; 700/90; 709/202; 709/213; 709/225; 709/228; 707/781; 705/30

(58) Field of Classification Search
USPC .............................................................. 726/4
See application file for complete search history.

(56) References Cited

U.S. PATENT DOCUMENTS

| | | | | | |
|---|---|---|---|---|---|
| 4,853,843 | A | * | 8/1989 | Ecklund ................................ | 1/1 |
| 5,682,532 | A | * | 10/1997 | Remington et al. .......... | 719/316 |
| 5,835,757 | A | * | 11/1998 | Oulid-Aissa et al. ................ | 1/1 |
| 6,173,404 | B1 | * | 1/2001 | Colburn et al. ................. | 726/17 |
| 6,999,956 | B2 | * | 2/2006 | Mullins ................................ | 1/1 |
| 7,275,236 | B1 | * | 9/2007 | Kabe .............................. | 717/106 |
| 7,426,565 | B1 | | 9/2008 | Tormasov et al. | |
| 7,457,918 | B2 | * | 11/2008 | Marwinski et al. ........... | 711/133 |
| 7,603,374 | B2 | * | 10/2009 | Cameron et al. ...................... | 1/1 |
| 7,739,121 | B2 | * | 6/2010 | Jain et al. ........................ | 705/1.1 |
| 7,792,801 | B2 | * | 9/2010 | Hamilton et al. .............. | 707/655 |
| 7,873,319 | B2 | * | 1/2011 | Lastinger et al. ............. | 455/63.1 |
| 7,873,700 | B2 | * | 1/2011 | Pawlowski et al. ........... | 709/213 |
| 7,933,956 | B2 | | 4/2011 | Hon et al. | |
| 8,181,006 | B2 | * | 5/2012 | Charles et al. ..................... | 713/2 |
| 2001/0032314 | A1 | * | 10/2001 | Ansper et al. .................. | 713/176 |
| 2002/0076674 | A1 | * | 6/2002 | Kaplan .......................... | 434/107 |
| 2002/0095463 | A1 | | 7/2002 | Matsuda | |
| 2004/0162841 | A1 | * | 8/2004 | Bernstein et al. ............. | 707/100 |
| 2004/0255140 | A1 | * | 12/2004 | Margolus et al. .............. | 713/193 |
| 2004/0267694 | A1 | * | 12/2004 | Sakai et al. ........................ | 707/1 |
| 2004/0268142 | A1 | * | 12/2004 | Karjala et al. ................. | 713/200 |
| 2005/0015725 | A1 | * | 1/2005 | Matsuda ........................ | 715/706 |
| 2005/0144405 | A1 | * | 6/2005 | Doran et al. ................... | 711/156 |
| 2005/0229258 | A1 | * | 10/2005 | Pigin ............................... | 726/27 |

(Continued)

OTHER PUBLICATIONS

Kambayashi et al., "Digital Tags: Data with Restricted Accessibility for e-Commerce Applications", 2001.*

(Continued)

*Primary Examiner* — Krista Zele
*Assistant Examiner* — Ondrej Vostal
(74) *Attorney, Agent, or Firm* — Fountainhead Law Group PC

(57) ABSTRACT

In one embodiment the present invention includes a computer-implemented method comprising storing authorization data on a first client computer system, accessing virtual computing software from the first client computer system, accessing a virtual object in the virtual computing software in response to instructions received from the first client computer system, sending the authorization data from the first client computer system to a second computer system, wherein the authorization data specifies access rights on the second computer system, and accessing the second computer system using the authorization data and determining access rights on the second computer system based on said authorization data.

19 Claims, 12 Drawing Sheets

(56) References Cited

U.S. PATENT DOCUMENTS

| | | | |
|---|---|---|---|
| 2006/0174352 A1* | 8/2006 | Thibadeau | 726/27 |
| 2006/0178968 A1* | 8/2006 | Jung et al. | 705/35 |
| 2006/0218651 A1* | 9/2006 | Ginter et al. | 726/27 |
| 2006/0220829 A1* | 10/2006 | Johnson | 340/505 |
| 2006/0271691 A1* | 11/2006 | Jacobs et al. | 709/228 |
| 2006/0282461 A1* | 12/2006 | Marinescu | 707/103 Y |
| 2007/0208800 A1* | 9/2007 | Frohlich et al. | 709/203 |
| 2008/0109242 A1* | 5/2008 | Shear et al. | 705/1 |
| 2008/0127304 A1* | 5/2008 | Ginter et al. | 726/2 |
| 2008/0282319 A1* | 11/2008 | Fontijn et al. | 726/1 |
| 2009/0144148 A1* | 6/2009 | Jung et al. | 705/14 |
| 2009/0210347 A1* | 8/2009 | Sarcanin | 705/67 |
| 2009/0254422 A1* | 10/2009 | Jenkins et al. | 705/11 |
| 2009/0271369 A1* | 10/2009 | Cheng et al. | 707/3 |
| 2009/0287790 A1 | 11/2009 | Upton et al. | |
| 2009/0328171 A1* | 12/2009 | Bayus et al. | 726/7 |
| 2010/0114662 A1* | 5/2010 | Jung et al. | 705/10 |
| 2010/0146608 A1* | 6/2010 | Batie et al. | 726/7 |
| 2010/0161456 A1* | 6/2010 | Boss et al. | 705/30 |
| 2011/0107429 A1* | 5/2011 | Marilly et al. | 726/26 |

OTHER PUBLICATIONS

Tarumi et al., "Communication through Virtual Active Objects Overlaid onto the Real World", 2000.*

Scheffler et al., "Object-Capability Security in Virtual Environments", 2008.*

James J. Odell, H. Van Dyke Parunak, Mitch Fleischer, and Sven Brueckner, Modeling Agents and their Environment. 2001 (ERIM CEC and James Odell).

Robert Buderi, "Computing Goes Everywhere," Technology Review, Published by MIT, Jan. 2001.

* cited by examiner

SYSTEM AND METHOD OF CONTROLLING ACCESS TO INFORMATION IN A VIRTUAL COMPUTING ENVIRONMENT

BACKGROUND

The present invention relates to virtual computing, and in particular, to a system and method of controlling access to information in a virtual computing environment.

A virtual computing environment is a computer-based simulated space, which may for example allow for multiple users to inhabit and interact using avatars. As used herein, the term virtual computing environment refers to virtual environments and virtual worlds implemented on computer systems. The term virtual computing environment, as used herein, does not refer to virtual machines such as virtual servers from VMware®, for example. Avatars are typically depicted as three-dimensional graphical representations of each user. Communication between users range from text, graphical icons, visual gesture, or sound. Users in a virtual computing environment often have personal spaces. Personal space may be defined as an invisible area surrounding a user which functions as a buffered comfort zone during interaction with other users. FIG. 1 illustrates a typical virtual computing environment. System 100 may include a client computer 102 and client computer 104. A software application that enables communication and interaction in the virtual world may be installed on client 102 and client 104. Clients 102 and 104 may access server 108 over the internet 106. Server 108 may include virtual computing software 110.

One problem in current virtual computing environments is controlling access to data or functionality associated with objects in a virtual computing environment (virtual objects). In a virtual world, it may be beneficial for users who have access to certain virtual objects to control access to such objects and the data or functionality associated with such objects. In a virtual computing environment, it may be desirable to share the data or functionality associated with objects with other users. However, there is currently no efficient mechanism for allowing users to limit access to objects and associated data in a virtual world by other users. Thus, it would be desirable to improved system and method of controlling access to information in a virtual computing environment.

SUMMARY

Embodiments of the present invention improve controlling access to information in virtual environments and other systems. In one embodiment, the present invention includes a computer-implemented method of controlling access to information in a virtual computing environment comprising storing authorization data on a first client computer system, accessing virtual computing software from the first client computer system, accessing a virtual object in the virtual computing software in response to instructions received from the first client computer system, sending the authorization data from the first client computer system to a second computer system, wherein the authorization data specifies access rights on the second computer system, and accessing the second computer system using the authorization data and determining access rights on the second computer system based on said authorization data.

In one embodiment, the authorization data is sent to the second computer system without being received by the virtual computing software.

In one embodiment, the authorization data is sent based on a first location of the virtual object and a second location of a virtual representation of a user in the virtual computing software.

In one embodiment, the authorization data is sent if the virtual object and the virtual representation of the user are both in a predefined space in the virtual computing software.

In one embodiment, the authorization data is sent if a personal space associated with the virtual representation of the user encompasses the virtual object in the virtual computing software.

In one embodiment, the authorization data is sent based on authorization rights for a user in the virtual computing software that are associated with a particular virtual space in the virtual computing software.

In one embodiment, the authorization data is sent if a virtual representation of the user has associated authorization rights in the virtual computing software to enter a particular virtual space and if the virtual object is in the particular virtual space.

In one embodiment, the authorization data is sent if authorization rights associated with a first personal space for a first virtual representation of the user allow a second virtual representation of a second user to enter the first personal space.

In one embodiment, the authorization data comprises a public key certificate and an attribute certificate, the method further comprising determining authorization rights in the virtual computing software based on a user's public key certificate and an attribute certificate, wherein different attribute certificates are issued to different users based on a location of a virtual object in a hierarchically organized virtual space, and wherein the virtual object is located in the hierarchically organized virtual space.

In one embodiment, the method further comprises sending the attribute certificate to a certificate authority, wherein the certificate authority authorizes users to enter virtual spaces in the hierarchically organized virtual space to access virtual objects.

Embodiments of the present invention may be realized in a computer readable medium or installed software system. The following detailed description and accompanying drawings provide a better understanding of the nature and advantages of the present invention.

DETAILED DESCRIPTION

Described herein are techniques for use in a virtual computing environment. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
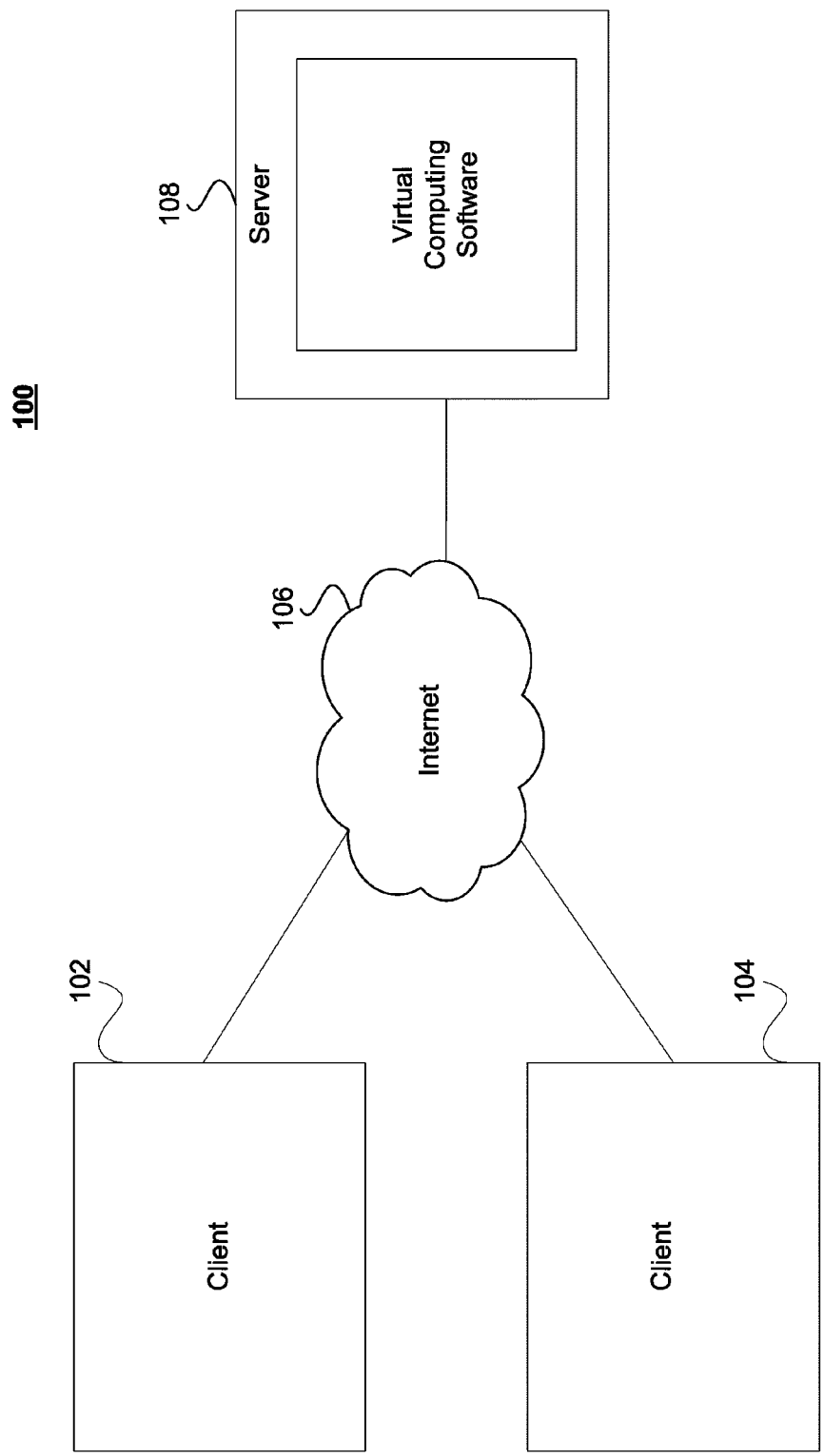
FIG. 1 illustrates a typical virtual computing environment.
Figure 2:
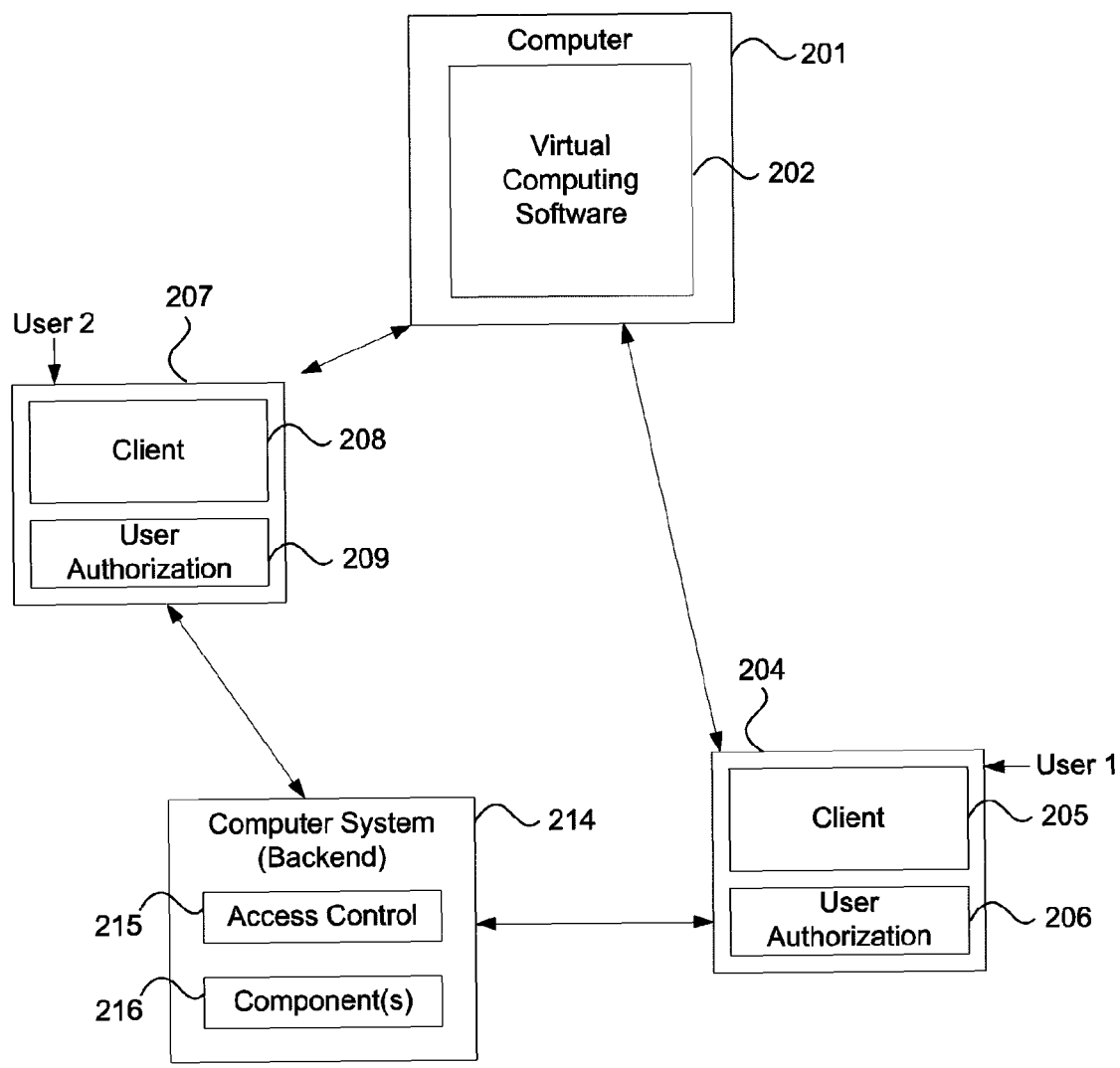
FIG. 2 illustrates a virtual computing environment according to one embodiment of the present invention.

FIG. 2 illustrates an example virtual computing environment according to one embodiment of the present invention. System 200 includes a first computer system 201 executing virtual computing software 202. The virtual computing software 202 allows users to virtually occupy and interact with each other in a simulated three-dimensional space. The virtual computing software 202 may be implemented on a dedicated server, server cluster, or peer-to-peer software system, for example. Users may access the virtual computing software 202 from client software systems 205 and 208 executing on computers 204 and 207, respectively. Embodiments of the present invention include virtual computing environments (virtual worlds) that include virtual objects linked to software components on another computer system 214, such as an enterprise computer system or "backend system", for example. Users of the virtual computing software 202 may send instructions, such as instructions to move an avatar in the virtual world, from client software to the virtual computing software to access the virtual objects using a variety of techniques, examples of which are described below. Accordingly, users may access components of computer system 214 that are linked to the virtual objects.

Different users may have different access rights inside different computer systems. For example, an enterprise computer system may be configured to allow one user to access a particular software application, such as a database, and may be configured to allow another user to access another software application, such as an ERP system. Each user's access rights to the different systems may be controlled based on the particular user's authorization data. Similarly, two users may be allowed to access different functionality or data in the same software application on a computer system based on each user's authorization data. In FIG. 2, computer system 214 includes an access control software component 215 that receives user authorization data and determines the features, functionality, or data that a particular user may access (e.g., access rights) based on the particular user's authorization data.

In one embodiment, user authorization data for a user of a client is stored on the same computer system as the client. For example, the user of client 205 may have user specific user authorization data 206, and the user of client 208 may have user specific user authorization data 209. The user authorization data may include one or more of a login identification, a password, a private key, or other user specific codes (e.g., credentials) for identifying a particular user to determine access rights for the user. Accordingly, if a user accesses a virtual object in virtual computing software 202, virtual computing software 202 may map the virtual object to a particular component 216 of computer system 214. Here, component 216 is the implementation of features, functionality, or data that a particular user may access in computer system 214. Component 216 on computer system 214 may include features, functionality, data, or data visualizations (e.g., reports) available in computer system 214, for example. To access component 216 of computer system 214 that is associated with the accessed virtual object, virtual computing software 202 may send a message to the user's computer system instructing the user's computer system to send the user authorization data to computer system 214 to obtain access to the specified component 216. Therefore, a user may access such components through the virtual world by accessing the virtual objects in the virtual computing software that are linked to the components on the other computer system. Access to the components 216 is determined on computer system 214 using user authorization data for the user, which is stored on the user's computer system. In one embodiment, the user authorization data for each user is advantageously maintained on the user's computer and is sent to computer system 214 without being received by the virtual computing software 202. This enhances security and reduces the likelihood that sensitive authorization data does not become compromised.

In one embodiment, authorization data may be sent based on a location of a virtual object and a virtual representation of a user in the virtual computing software. For example, in a virtual world, virtual objects may be located at different positions in a three-dimensional space. Additionally, a user may be represented inside the virtual world using an avatar or other virtual identifier. In one embodiment, if the virtual representation of the user and the virtual object are in a particular location relative to each other, then a system associated with the virtual object is accessed on another system. For example, in one embodiment described in more detail below, if the virtual representation of the user (e.g., an avatar) is in the same virtual space (e.g., a building, room, area, estate, or floor) as the virtual object, then the system may attempt to access a system linked to the virtual object. In another example described in more detail below, if a personal space associated with the virtual representation of the user encompasses the virtual object, then the system may attempt to access a system linked to the virtual object.

Similarly, authorization data may be sent from a user's client machine to another system based on the user's authorization rights associated with a virtual space in the virtual computing software. For example, the virtual computing system may associate authorization rights with particular virtual spaces in the virtual world. One user may be authorized to enter a particular space and another user may not be authorized to enter the same space. For example, a user may be authorized to enter a building or room in the virtual world, whereas another user may be authorized to enter the building but not the room. If a virtual object is in the room, one user may be able to access information associated with the virtual object based on the user's authorization to enter the room, and another user may not be authorized to enter the room and therefore may not access information associated with the virtual object in the room. Authorization data stored on a user's client computer may be sent to a backend system if a user is authorized to enter a particular virtual space and a virtual object is in the space, for example.

Example Implementation—Hierarchical Access Control

Figure 3A:
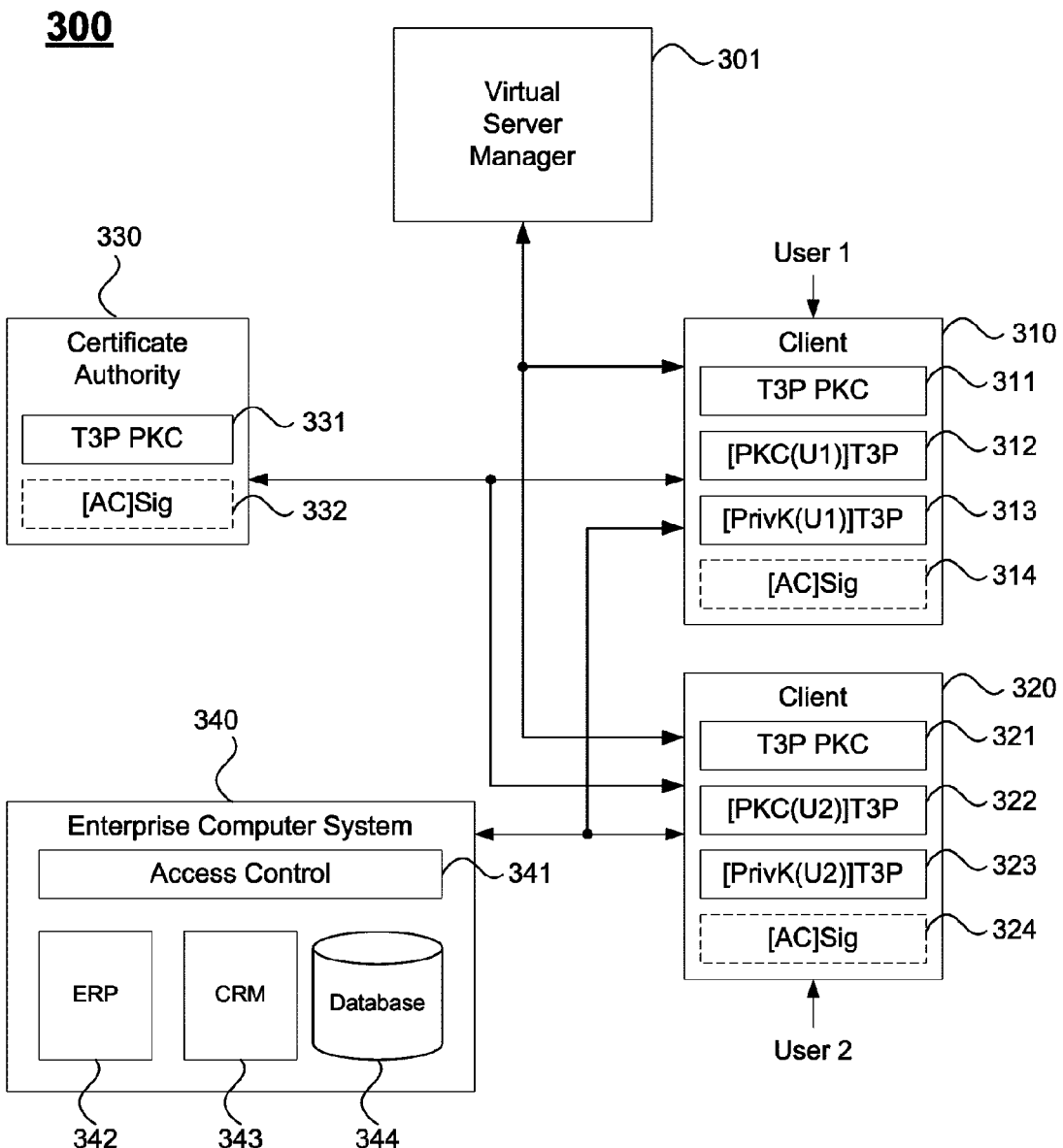
FIG. 3A illustrates an example virtual computing environment according to one embodiment of the present invention.
Figure 3B:
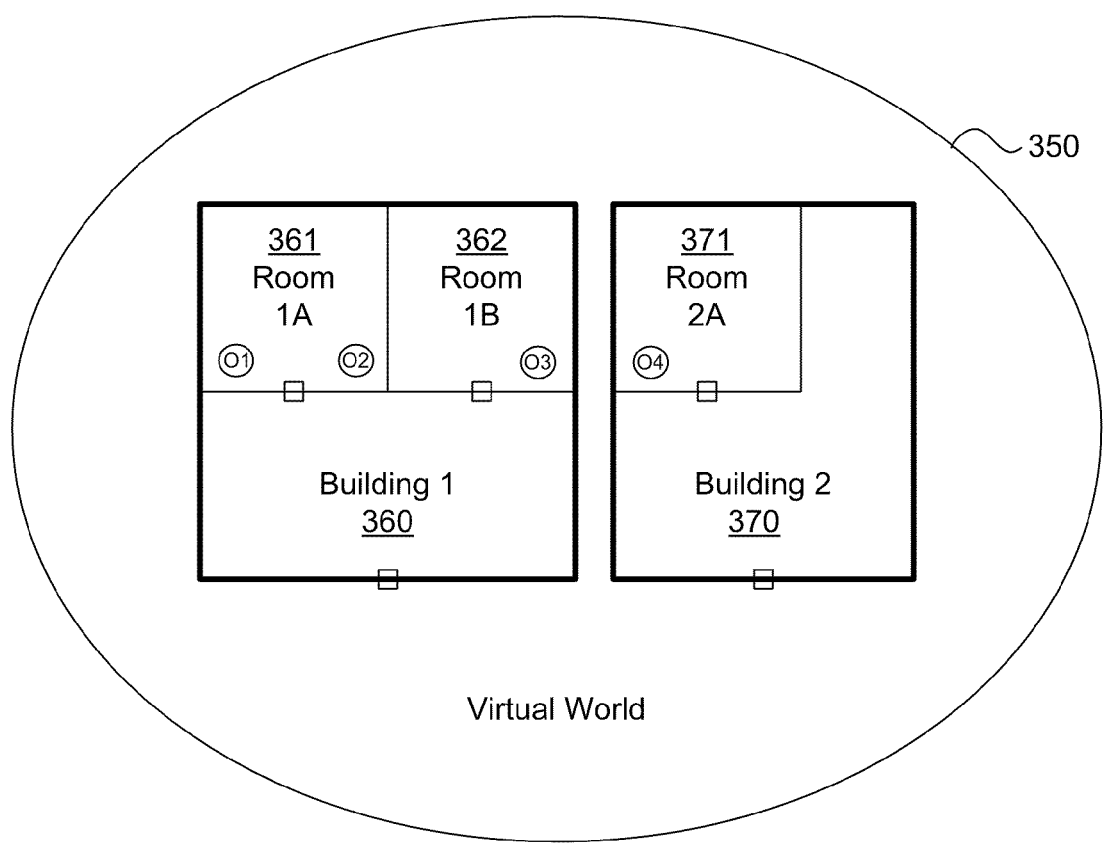
FIG. 3B illustrates an example of hierarchical access control in a virtual computing environment according to one embodiment of the present invention.

FIG. 3A illustrates an example virtual computing environment according to one embodiment of the present invention. In this example implementation, multiple users may access a virtual server manager 301, which is one implementation of virtual computing software, through clients 310 and 320, for example. Virtual server manager 301 creates the virtual world where users may interact and access virtual objects. FIG. 3B illustrates an example of hierarchical access control in a virtual computing environment according to one embodiment of the present invention. The virtual world 350 may be configured to include virtual spaces. In this example, the virtual world 350 may include two buildings 360 and 370. Each building, in turn may be configured to include one or more rooms, such as Room 1A 361, Room 1B 362, and Room 2A 371. Virtual objects O1, O2, O3, and O4 may be located in particular virtual spaces. In this example, virtual objects O1 and O2 are in Room 1A, virtual object O3 is in Room 1B, and virtual object O4 is in Room 2A.

In this example, access to virtual objects may be based on a particular user's authorization rights to access particular virtual spaces in the virtual environment. Such authorization rights may be the same as, or different than, authorization rights on other systems that may be linked to virtual objects in the virtual spaces. Authorization rights in the virtual environment may be controlled by the virtual computing software based on authorization data provided by a user when the user enters the virtual environment (e.g., a login and password or a PKI infrastructure as described below). In this example, a particular virtual world 350 may be under the control of a particular user (e.g., an owner), and other users must have authorization rights to enter virtual world 350. Accordingly, in this example, in order to obtain access to public places inside of virtual world 350, a user, having a virtual representation visualized as avatar, must have been authorized by the owner. An authorized user can create a private self contained space visualized as a building, or a room in an existing building, as part of the virtual world. Within the self-contained space, the user is the owner. In this example, by default, if one user creates a virtual space, no other user has access to the virtual space. However, as owner of the virtual space, the user can authorize other users to enter the virtual space or authorize other users to create their own self-contained virtual space within the virtual space. In this example, when a user enters a virtual space, the user enters through a door, and authorization rights to enter the door are checked at the door by the virtual computing software. If a user has authorization rights in the virtual computing environment to enter the virtual space, then the user is allowed to access the space, and if the user does not have authorization rights to enter the virtual space, then the user is not allowed to access the space.

Figure 4:
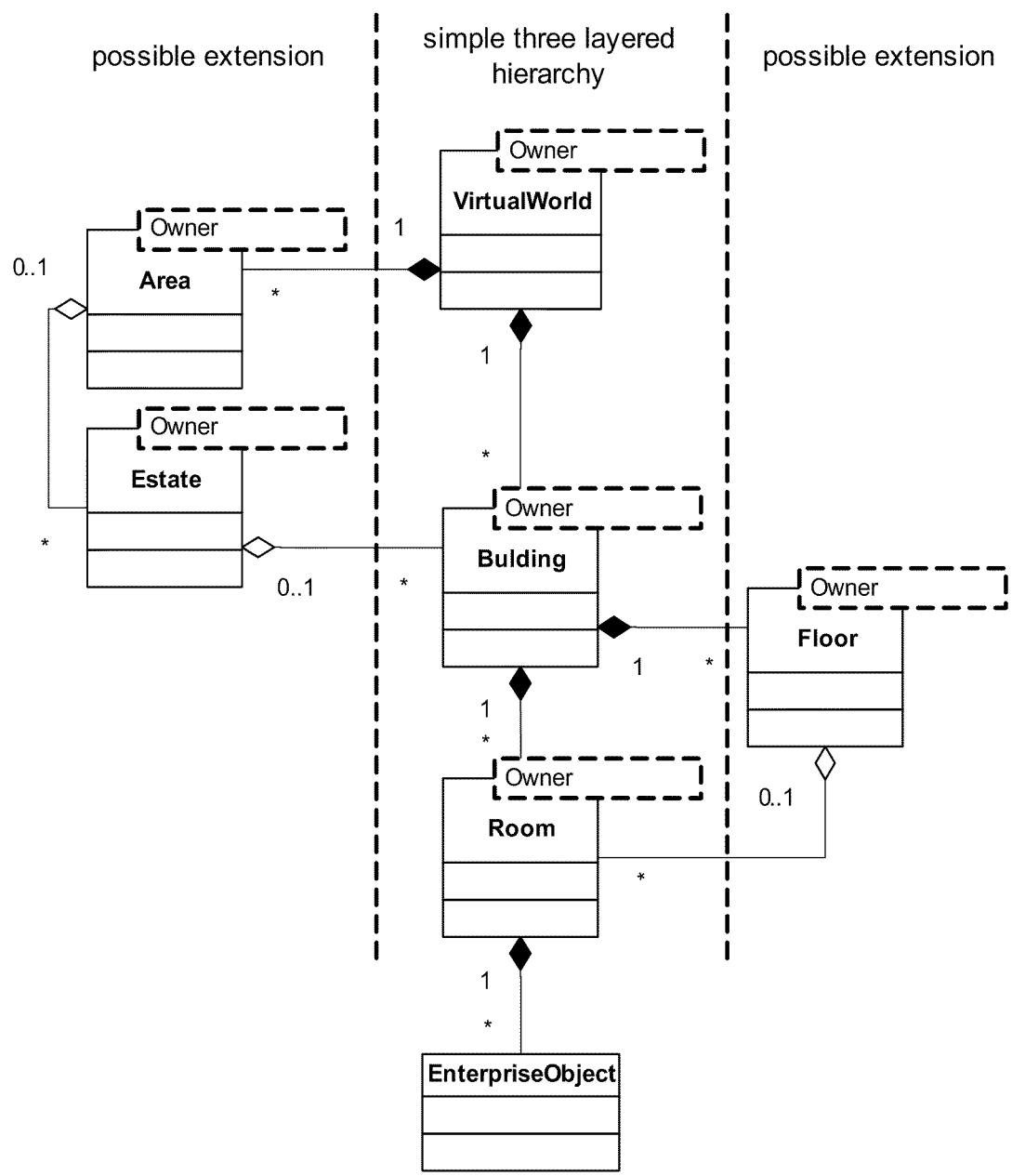
FIG. 4 illustrates an example of hierarchical virtual spaces in a virtual computing environment.

In this example, users may place virtual objects within the virtual world at a location for which they have authorization rights. The users that intend to access the virtual object must have authorization rights in the virtual environment to access to the virtual object's location. FIG. 4 illustrates an example UML diagram of hierarchical virtual spaces in a virtual computing environment. As illustrated in FIG. 4, the virtual spaces may be configured hierarchically. Accordingly, the authorization rights in the virtual environment corresponding to the virtual spaces are similarly hierarchical. In FIG. 4, each virtual space has an associated owner. It is to be understood that different virtual spaces may have different owners. The owner fields in FIG. 4 may be assigned different values representing which user owns the space (e.g., owner=user1 or owner=user2).

Figure 5:
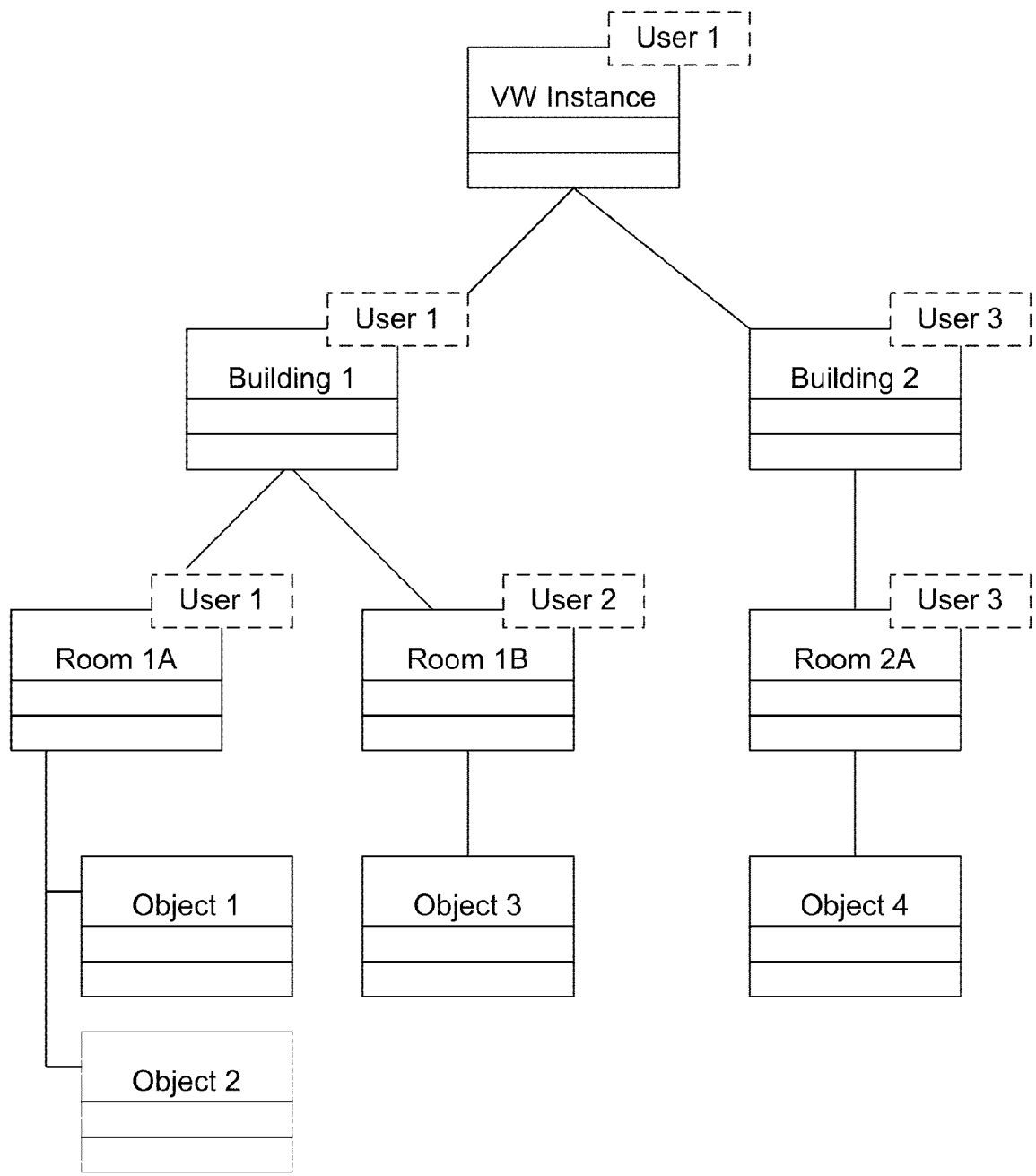
FIG. 5 illustrates an example of access control based on a hierarchy of virtual spaces in a virtual computing environment.

Referring again to FIG. 3B, the access control hierarchy in this example consists of virtual world 350, buildings 360 and 370, and rooms 361, 362, and 371. In this example, virtual objects are placed in each room. It is to be understood that other layers of virtual spaces can be added in between the virtual spaces shown to get a more granular hierarchy (e.g. areas, estates, floors) as illustrated in FIG. 4. The virtual world may be owned by user1. User1 may grant authorization rights that allow user3 to create private virtual spaces in virtual world 350, for example. However, user1 may only grant authorization rights to another user that allow the other user to enter only, but not to allow the user to create private virtual spaces. In this example, both user1 and user3 may create a building where they define local access rights. User1 may create Building 1 360 and user3 may create Building 2 370, for example. Accordingly, within Building 2, user3 has full rights to control the access of sub-spaces and virtual objects. User1 creates Room 1A 361 and controls the authorization rights to this room. User3 creates Room 2A 371 and controls the authorization rights to this room. Finally, user2 is granted authorization rights by user1 to create Room 1B 362 in Building 1. User1 places two virtual objects O1 and O2 in Room 1A, user2 places one virtual object O3 in Room 1B, and user3 places one virtual object O4 in Room 2A. In the end, there are three groups of virtual objects visualized in three rooms with different access rights. The corresponding access hierarchy is visualized in FIG. 5.

Based on the above example, if another user, UserX, wants to access virtual object O3, then such user must have the following permissions:

Permission to enter virtual world 350 from user1;
Permission to enter Building 1 by user1; and
Permission to enter Room 1B by user2.

Example Implementation Using Public Key Infrastructure ("PKI")

Referring again to FIG. 3A, the present example implements hierarchical access control using a PKI system. In this example, virtual objects in virtual server manager 301 may be linked to components of an enterprise computer system 340. Access to these virtual enterprise objects (or "enterprise objects") may be controlled using the hierarchical authorization rights described above using the PKI infrastructure. In this example, the there is an existing Public Key Infrastructure (PKI) in which a trusted Certificate Authority (CA) 330 exists, which may be a trusted third party (T3P) Authentication Service (AS), for example. The AS may be a server application that is part of a secure environment, where write access is only possible for authorized entities. The AS may be a designated physical machine (i.e., computer), but could also be hosted on a client machine of a virtual world owner or on the same machine as the virtual world, for example, if the machine is hosted within a secure environment. The CA verifies certificates based on stored trusted certificates, such as trusted third party public key certificate ("T3P PKC") 331.

A copy of the T3P PKC is stored on the computer of each user. Further, each user owns a private key and a Public Key Certificate (PKC) that is signed by the PKI's CA 330. Specifically, user 1 may access the virtual server manager using client 310. Accordingly, client 310 includes a private key ("PrivK") 313 signed by the CA 330 (e.g., "[PrivK(U1)] T3P") and a PKC 312 signed by the CA 330 (e.g., "[PKC (U1)]T3P"). Additionally, client 310 includes T3P PKC 311 for accessing the CA. The T3P PKC 311, PKC 312, and PrivK 313 may be stored in a computer memory, for example. Similarly, a second user, user2, may access the virtual server manager using client 320. Accordingly, client 320 includes a private key ("PrivK") 323 signed by the CA 330 (e.g., "[PrivK (U2)]T3P") and a PKC 322 signed by the CA 330 (e.g., "[PKC(U2)]T3P"). Additionally, client 320 includes T3P PKC 321 for accessing the CA. The T3P PKC 321, PKC 322, and PrivK 323 may also be stored in a computer memory, for example. The client hardware may be any device that is able to support the client software. Users may authenticate connections to enterprise computer system components (e.g., enterprise applications) that are linked to virtual objects using the user's PKC.

In one embodiment, if an owner of virtual world 350, or any users of virtual world 350, send instructions from a client to enter virtual world 350, then such users may be required to be identified by the user's signed PKC. Additionally, in one embodiment, a user may be required to request an Attribute Certificate (AC) signed by the virtual world owner to gain AC specific rights within the world. AC's signed by the owner of a virtual space may be stored on the user's client computer and on the CA 330. For example, CA 330 may include one or more ACs 332 and clients 310 and 320 may each include one or more ACs 314 and 324. An attribute certificate (also known as an authorization certificate) is a digital document that describes a written permission from the issuer to use a service or a resource that the issuer controls or has access to use. The AC may be a digitally signed (or certified) identity and set of attributes specifying the authorization rights in the virtual world. CA 330 may store ACs issued users to grant specified authorization rights (e.g., to particular virtual spaces). Actions requiring validated ACs (e.g., entering a room) may be processed on CA 330 and a signed AC is sent as a response. In some embodiments, CA 330 may offer two kinds of ACs. The first type of AC may authorize a user to enter public places within the virtual world. The second type of AC may authorize a user to create a private self-contained space in which he is the local CA. Within its self-contained space, the user offers ACs to other users, which in turn allow either entry only or entry and creation of additional self-contained spaces for that user. Therefore, virtual enterprise objects that are deployed within the virtual world can only be accessed by users that are authorized to access the location of the object. As described further below, the corresponding request to enterprise computer system 340 contains the user's PKC and ACs to authenticate the user and define authorization rights in the virtual world. Therefore, a visualized access control system based on an avatar, for example, walking through buildings and rooms with walls and doors may be fully supported by the PKI security infrastructure.

Advantages of this approach allow using virtual worlds to control and group the access to virtual objects hierarchically. Access rights are visualized using natural concepts like walls and doors. In the above example, no additional security infrastructure other than the disclosed PKI may be required. Within the virtual world, attribute certificates are used that are signed by trusted PKC. Security critical parts like private keys stay on a user's client machine and are not shared within the virtual world.

The following is an example process for accessing a virtual object in a private virtual space. It is assumed that the user has access to the parent space. For example, it is assumed that the user has access to the virtual world prior to attempting access to a building in the virtual world, and it is assumed that the user has access to the building before attempting access to a room in the building. Referring to FIG. 3A, User 1 may have a private virtual space that includes virtual objects. User 1 may create an AC that gives access to another user and send the AC to the CA 330. CA 330 may authenticate User 1 using User 1's credentials (e.g., User 1's PKC and AC for the space in which User 1 is granting access). CA 330 may perform a mapping between ACs and entities in the virtual world to control access, for example. If User 1 is authenticated by CA 330, CA 330 may forward the AC to User 2 so that the AC to access the particular space may be added to User 2's credentials. When User 2 enters the virtual world, client 320 sends a request to virtual server manager 301 to enter. The request may include User 2's credentials. For example, User 2 may send an access request containing User 2's Public Key Certificate (PKC) and the Attribute Certificate (AC) that grants access to the virtual world (or a parent space) of the owner (e.g., User 1). The virtual server manager 301, in turn, calls the CA 330 to authenticate User 2 and forwards User 2's credentials. If User 2's credentials are authenticated, then virtual server manager 301 sends virtual world data to client 320, and client 320 visualizes the data and may place User 2's avatar at a designated entry point in the virtual world.

If User 2 desires to access a virtual space owned by User 1, client 320 sends instructions to virtual server manager 301 to enter the virtual space. Virtual server manager 301 may then call CA 330 to determine if User 2 has access to the space. If access has not been setup, User 2 may be required to request access to the space. In this case, a request for access may be made through the CA 330. User 2 may send the PKC 322 only (because User 2 does not have the necessary AC for the space). CA 330 may forward the request for User 2 access to the owner (e.g., User 1) of the space. The owner may verify certificates and decides whether to give access or not. If access is to be given, the owner creates an AC on client 310 defining the granted access rights for the user to this space. The owner may sign the AC and forward the AC to User 2. The AC may be sent to User 2 through CA 330 and CA 330 may store the AC to use for later authorization. If User 2 now attempts to enter the space (e.g., through a virtual door), then CA 330 will now allow User 2's action (because User 1 has sent the necessary AC to User 2). User 2 is now authenticated with the appropriate PKC and the AC corresponding to the space. Access is granted. Accordingly, CA 330 sends an authorization to virtual server manager 301, and virtual server manager 301 may invoke the virtual space. For example, virtual server manager 301 may forward an "enter( )" call instruction to an "enter( )" method of the entry point for a software object representing the space. Virtual server manager 301 may forward data for the space to client 320, which in turn visualizes the data (e.g., as an avatar entering a room). If a virtual object is in the virtual space, User 2 may access the virtual object. A connection to a particular enterprise computer system component (e.g., application, data, etc. ... ) is created and User 2's credentials (e.g., the PKC and related ACs) are sent to the system 340. For example, system 340 may include an access control component 341 that receives User 2's credentials and determines authorized access rights. If permission is granted to the component on system 340 that is linked to the virtual object, then the user may access entities on system 340 that are related to the virtual object. Accordingly, a connection with the user specific access rights is created and User 2 accesses the backend system 340 through the virtual enterprise object in the virtual space.

Example Implementation—Personal Spaces

Figure 6:
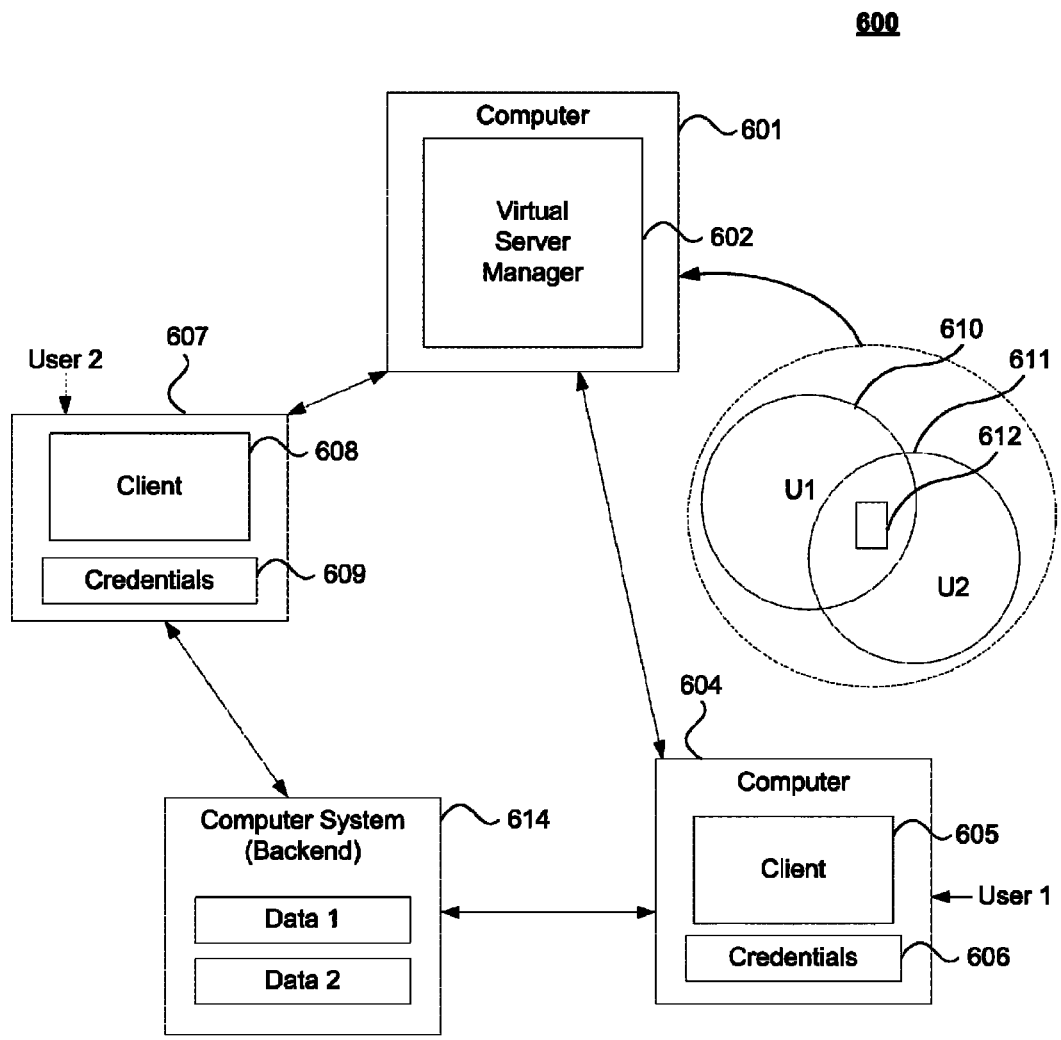
FIG. 6 illustrates an example virtual computing environment according to one embodiment of the present invention.

FIG. 6 is an example virtual computing environment 600 according to one embodiment of the present invention. Virtual computing environment 600 may include a computer simulated space that allows multiple users to move a representation of themselves ("avatars") around in the virtual world. Users of system 600 may share and exchange data or functionality of certain virtual objects in the space. System 600 may include a virtual server manager software component 602 running a computer system 601. Virtual server manager 602 may be used to manage the virtual computing environment. For example, it may manage the interactions of users, the avatars, or the virtual objects, for example. System 600 may also include another computer system 604 and computer system 607. Computer systems 604 and 607 may include client software components 605 and 608. Clients 605 and 608 may provide the interfaces for communication and interaction between users from computer systems 604 and 607 and the virtual server manager 602 on computer system 601. Clients 605 and 608 may also enable users of computer systems 604 and 607 to manage their virtual personal spaces in the virtual computing environment. For example, a user of computer system 604 (User 1) may specify a personal space 610, and a user of computer system 607 (User 2) may also specify a personal space 611. User 1 and User 2 interface with the virtual server manager 602 through clients 605 and 608, respectively, and thereby are able to interact with each other, other users, and virtual objects in the virtual world, for example.

Features and advantages of the present invention allow a user in a virtual computing environment to be able to control access to features of a virtual object 612. Generally, a virtual object 612 may be associated with data or functionality supported by another remote computer system, such as computer system 614. In one embodiment described in more detail below, the virtual object is an enterprise virtual object that has corresponding data and functionality in an enterprise computing system, for example. In some embodiments, there may be one or more enterprise objects included in a virtual computing environment, and the virtual computing environment may be linked to an enterprise computing system to allow users to manipulate objects using a virtual environment as described in more detail below. Accordingly, computer system 614 may be a backend system, for example, that is part of the enterprise computing system (e.g., a backend database or application such as ERP, CRM, or other data source).

Generally, User 1 on computer system 604 may move personal space 610 to encompass object 612 in the virtual computing environment. Object 612 may be associated with data on computer system 614 (e.g., Data 1). Before a request for the data can be accessed from computer system 614, the user's credentials may be verified. Computer system 604 includes stored credentials 606 necessary for accessing data by the user on computer system 614. Credentials 606 may include a user name and password, for example, or other forms of authentication information that may be used by computer system 614 to authenticate a user, and thereby determine if a particular user has permission rights to access data or functionality associated with object 612. Once User 1's credentials have been verified by computer system 614, computer system 604 may access the data or functionality that is associated with virtual object 612 from computer system 614.

In another example, User 6 on computer system 607 may move a second personal space 611 to also encompass enterprise object 612 in the virtual computing environment. Thus, object 612 may be encompassed by both personal space 610 and personal space 611. User 1 of computer system 604 may have designated the object 612 as a shared object, thereby allowing some or all of the features associated with virtual object 612 that are available on computer 614 (e.g., Data 1) to be shared with User 2. When the personal spaces 611 and 612 both encompass object 612, virtual server manager 602 on computer system 601 may send a message to client 605 on computer system 604 to access data associated with object 612 to be shared with User 2, for example. The message may further notify User 1 that object 612 has been encompassed by a second personal space. In response to the message, computer system 604 may use stored credentials 606 to access data associated with object 612 from computer system 614. For example, in response to the message received from virtual server manager 602 on computer 601, client 605 on computer 604 may generate a request for data associated with object 612. The request for data may be sent to computer 614, and the request may include credentials 606 that are required to access the data, for example. Once User 1's credentials have been verified by computer system 614, computer system 604 may access the data (e.g., Data 1) that is associated with object 612 on computer system 614 to the extent permitted by credentials 606 (e.g., different users may have different access rights with different scopes to different data and different functionality). Accessed data, for example, may be sent from computer system 614 to client 605 on computer system 604 in the form of a response. Accordingly, client 605 on computer 604 may receive the response from computer 614 and automatically route the response to virtual server manager 602 on computer system 601. If object 612 is designated as a shared object, virtual server manager 602 on computer system 601 may then route the data to User 2 on computer system 607. Virtual server manager 602 may also route the data to User 1 on computer system 602 as part of a data update. If object 612 is not designated as a shared object, User 2 may not access the data associated with it.

In another embodiment, enterprise object 612 may be further associated with second data or functionality (e.g., Data 2) on computer system 614 that are within the scope of permissions for User 2 but not User 1. Accordingly, computer system 607 may store credentials 609 that may be used to access Data 2, for example. If object 612 is encompassed by both personal space 610 and personal space 611, then virtual server manager 602 may send a message to computer system 607 to access Data 2. In response to this message, computer system 607 may use stored credentials 609 to access data associated with object 612 on computer system 614 (e.g., Data 2). Once User 2's credentials have been verified, computer system 607 may access Data 2 that is associated with object 612 from computer system 614. Accordingly, once computer system 607 retrieves Data 2 from computer system 614, it may route the data to virtual server manager 602 on computer system 601. To share the data, virtual server manager 602 may then route the data to User 1 on computer system 604.

Features and advantages of the present invention include interactive communication between users when personal spaces encompass a virtual object at the same time. For example, User 1 and User 2 of personal spaces 610 and 611, respectively, may communicate with one another to designate which data to retrieve and share. For example, if two different users have two different authorization rights to the same virtual object, then the users may collaboratively share data, graphics, or other functionality that one user has but the other does not. Communication in the virtual environment may be provided to allow such collaboration. For example, communication may include a telephone conference, electronic mail, instant messaging, or another integrated messaging system included in the virtual server manager 602, for example. In one example, enterprise object 612 may be associated with number of user vacation days stored in a backend computer system 614. When the personal spaces of both User 1 and User 2 encompass object 612, then a messaging feature may be automatically enabled to allow User 2 to request access to User 1's vacation information (e.g., if the two users want to coordinate a business trip with a vacation). If User 1 agrees to share User 1's vacation data with User 2, then object 612 may show User 1's vacation days to both users. If User 2 agrees to share User 2's vacation data with User 1, then object 612 may show User 2's vacation days to both users. If both users share access to their vacation data, then both users may view each others' vacation data. The vacation data may reside on a different computer system running a different software system.

Figure 7:
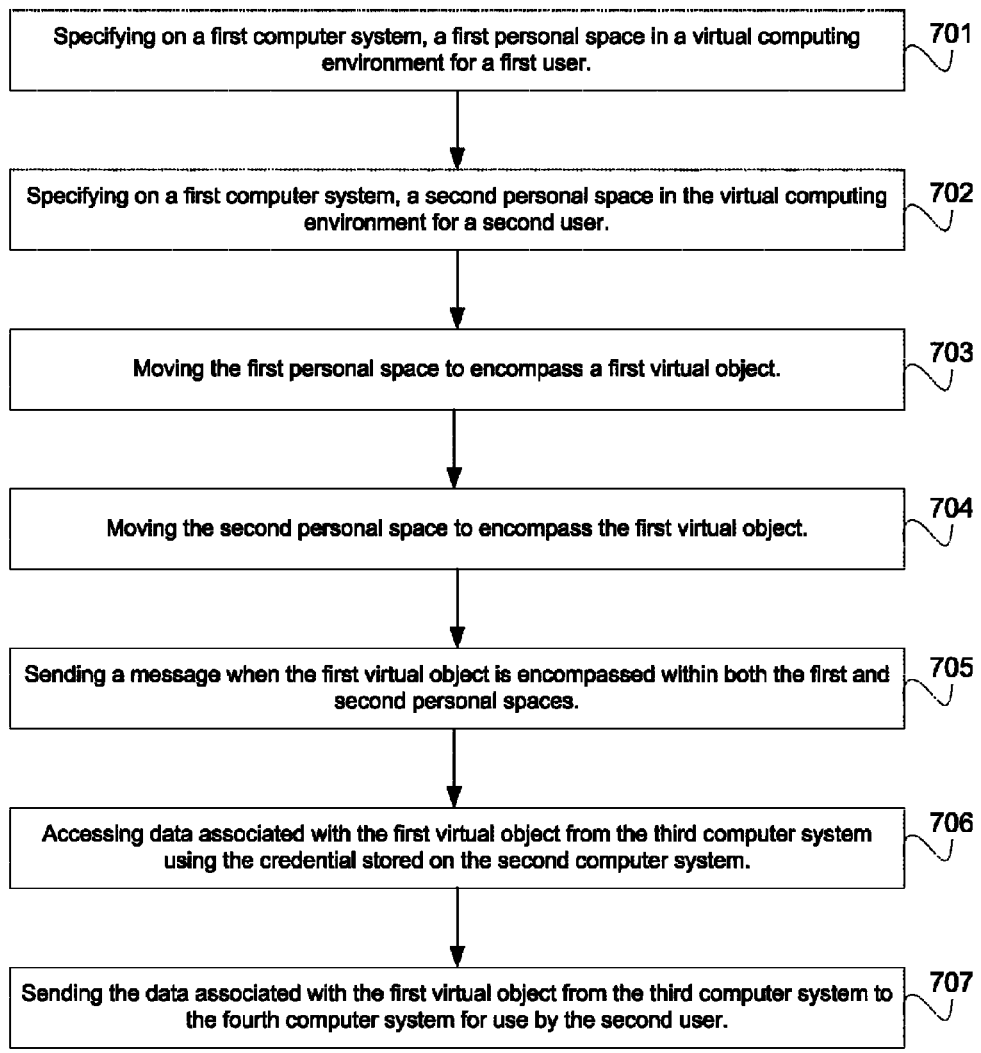
FIG. 7 illustrates a method for use in a virtual computing environment according to one embodiment of the present invention.

FIG. 7 illustrates an example of accessing data in a virtual computing environment according to one embodiment of the present invention. The present example illustrates the steps in controlling access to data in a virtual computing environment. At 701, a first user specifies a first personal space in a virtual computing environment on a first computer system. The first computer system may be one or more computers executing virtual server manager software, for example. At 702, a second user specifies a second personal space in the virtual computing environment on the first computer system. There may be a plurality of users specifying additional personal spaces. Users may have access to virtual objects (e.g., virtual enterprise objects) that may be included in a virtual computing environment. Virtual enterprise objects may be objects displayed in the virtual environment that may be used to trigger actions in backend computer systems, such as data access or data visualization routines, for example. The virtual objects may be associated with data stored on a third computer system, for example. At 703, the first personal space is moved to encompass a first virtual object. For instance, the first user may control the first personal space from a second computer system that is remote from the first computer system. The first user may access the data that the virtual object is associated with from a third computer system (e.g., a backend system) as described below using a credential stored on the second computer system, which is necessary for accessing the data. At 704, the second personal space may be moved to encompass the first virtual object. For example, the second personal space may be moved under control of the second user on a fourth computer system. At 705, a message may be sent from the first computer system to the second computer system. For example, when the first virtual object is encompassed within both the first and second personal spaces a message may be triggered to access data or functionality from the third computer system. At 706, in response the message, data associated with the first virtual object may be accessed from the third computer system using the credential stored on the second computer system. At 707, the data associated with the first virtual object is sent from the third computer system to the fourth computer system for use by the second user.

Figure 8A:
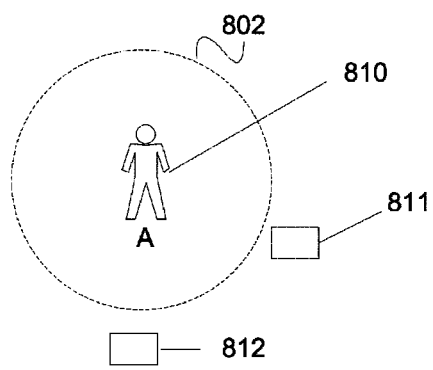
FIG. 8 illustrates an example of accessing data in a virtual computing environment according to one embodiment of the present invention.
Figure 8B:
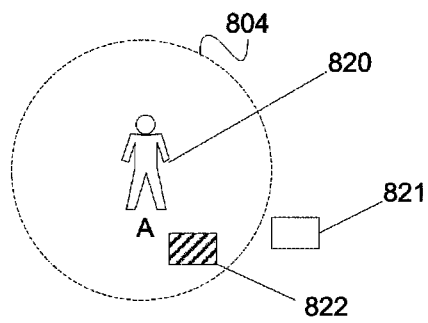

FIGS. 8A-B illustrates an example of accessing data in a virtual computing environment according to one embodiment of the present invention. The relative location of avatars and their personal spaces may impact the behaviors of enterprise objects. Personal spaces may surround a user's avatar or define a region in a virtual environment within which virtual objects or other avatars may have a different status, for example. Personal spaces may move through the virtual environment under control of the user, and as virtual objects or other avatars come into contact with the personal space, certain predefined functions may be performed by the virtual server software and/or clients to indicate the change in status and, for example, access data or functionality as described above. For example, personal space 802 for avatar A 810 does not encompass any enterprise objects (e.g., enterprise objects 811 and 812). Since there are no enterprise objects within personal space 802, it will not retrieve and reflect data to user A. However, personal space 804 for avatar A 820 encompasses enterprise object 822 in the virtual computing environment. Since enterprise object 822 is within personal space 804, it may retrieve and show the data that is available to the user of avatar A. Enterprise object 821 is outside personal space 804 and remains inactive.

Figure 9A:
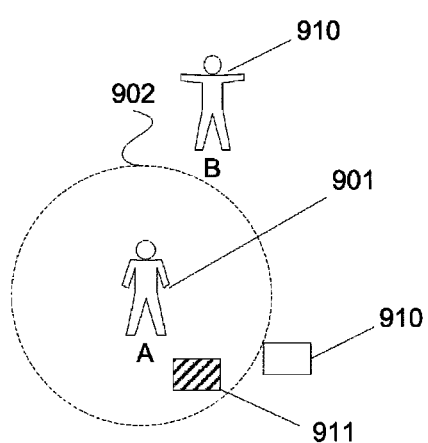
FIG. 9 illustrates another example of controlling access to data in a virtual computing environment according to one embodiment of the present invention.
Figure 9B:
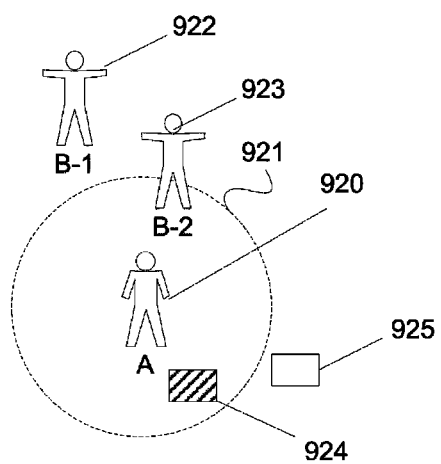

FIGS. 9A-B illustrates another example of controlling access to data in a virtual computing environment according to one embodiment of the present invention. The owner of a personal space may utilize different methods to control access to the space. At 902, avatar B 910 approaches the personal space belonging to avatar A 901. The initial communication to gain access to the space begins here. There may be one or more responses returned by avatar A. Avatar B 910 may be granted access to an active object 911 if avatar A 901 grants avatar B 910 permission to enter personal space 902. In one example in FIG. 9B, avatar A 920 has denied access to avatar B-1 922. Avatar B-1 may not physically move into personal space 921 of avatar A. In another example, avatar A has granted access to avatar B-2 923. Avatar B-2 is allowed to enter the space. Avatar B-2 can now access the shared data associated with enterprise object 924, which is active because it is inside Avatar A's personal space. However, in some embodiments, entry into a personal space does not automatically grant access to data associated with an enterprise object. For example, avatar A may grant access to A's personal space to avatar B-2. Avatar B-2 may physically enter the personal space, but may not have access to any shared data.

Figure 10:
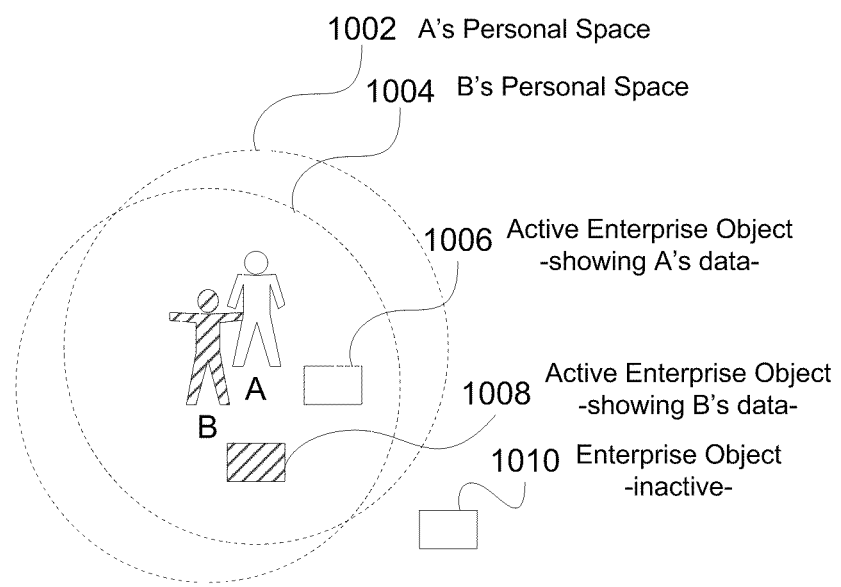
FIG. 10 illustrates another example of controlling access to data in virtual a computing environment according to one embodiment of the present invention.

FIG. 10 illustrates another example of controlling access to data in a virtual computing environment according to one embodiment of the present invention. In some instances, two personal spaces may overlap. This may affect the behaviors of any virtual objects that are encompassed within the overlapped spaces. For example, personal space 1002 overlaps with personal space 1004. Virtual object 1006 may be located within an overlapping zone of personal spaces 1002 and 1004. Virtual object 1008 may also be located within an overlapping zone of personal spaces 1002 and 1004. Virtual objects 1006 and 1008 may show the data belonging to one user at a time, for example. User A and user B may communicate with one another to decide which data the objects will represent (e.g., whose data each virtual object will show). For example, users A and B may decide that both virtual objects 1006 and 1008 may show user A's data first. In another example, users A and B may decide that both virtual objects 1006 and 1008 may show user B's data first. In one example, virtual object 1006 may be associated with number of vacation days for users. User A and user B agree that virtual object 1006 may show user A's vacation days first. Both User A and user B may have access to user A's data. Once user A and personal space 1002 moves away from virtual object 1006, it will show the data that belongs to user B or the nearest user. If there are no other users close to the object, virtual object 1006 may return to an inactive state. In another example, object 1008 may be associated with wages and withholdings data for users. User A and user B agree that virtual object 1008 may show user B's wages and withholdings data first. Both User A and user B may have access to user B's data. Once user B and personal space 1004 moves away from virtual object 1008, it will show the data that belongs to user A or the nearest user. If there are no other users close to the object, virtual object 1008 may return to an inactive state.

Personal spaces may vary according to different implementations. A personal space may be limited by surrounding objects. Like in real life, it is not enough to limit the personal space by its simple physical shape (e.g. a sphere). Personal spaces may be limited in areas behind walls which may be "out of sight" of the avatar, for example. However, a personal space may be defined as a configurable shape, a line of sight, or as a combination thereof on a display, for example. A personal space may even be the avatar itself.

Figure 11:
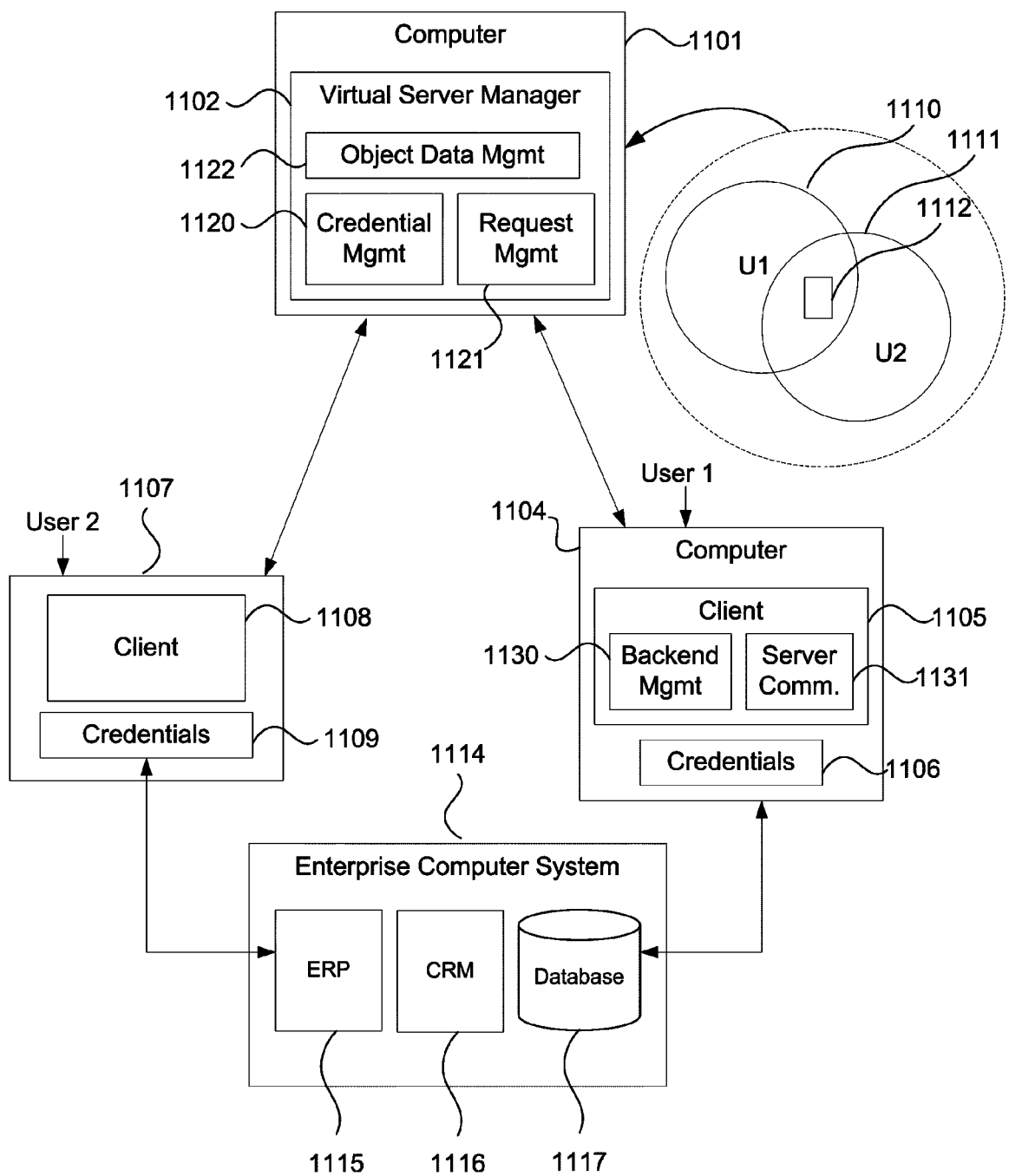
FIG. 11 illustrates an example of a virtual computing environment used to interface with an enterprise computer system according to another embodiment of the present invention.

FIG. 11 illustrates an example of a virtual computing environment used to interface with an enterprise computer system according to another embodiment of the present invention. In this example, virtual computing environment 1100 is a client-server system. Virtual computing environment 1100 includes a virtual server manager 1102 executing on a first computer system 1101. Multiple users may interact with each other in the virtual environment through clients, which may be remote from the server. In this example, a first user ("User 1") interacts with the virtual environment through client 1105 executing on computer 1104. Similarly, a second user ("User 2") interacts with the virtual environment through client 1108 executing on computer 1107. In this example, the virtual computing environment may be used to allow multiple users to interact with virtual objects linked to different aspects of objects in an enterprise computer system or other backend system. For example, interaction with virtual objects by users in the virtual computing environment may trigger corresponding actions in backend systems resulting in execution of algorithms or accessing and/or visualizing data stored in a backend system.

In this example, the virtual server manager 1102 accesses data and functionality on an enterprise computer system 1114 through clients 1105 and 1108. Enterprise computer system 1114 may include an ERP software system 1115, CRM software system 1116, and one or more databases 1117, for example. In this example, each user of the virtual computing environment 1100 is authenticated to use backend systems. For example, SAP systems may use SECUDE PSE Management, MS windows in general provides a central certificate store, while MacOS provides the user a "Keychain". Accordingly, each user's client system includes credentials that allow the user to be authenticated on the enterprise computer system 1114. In particular, computer 1104 may include credentials 1106 to authenticate User 1. Similarly, computer 1107 may include credentials 1109 to authenticate User 2. Advantages of this example embodiment ensure security because the users credentials do not leave the users machine to prevent identify theft. In order to ensure this, and provide access to enterprise systems, the actual access to the enterprise system is realized by the client software on each user's machine, using the credentials already available on the user's computer. As illustrated further below, objects in each user's personal space only get updated with the data collected from the corresponding backend system, while the user's credentials never leave the user's computer. This approach does not require any credentials to be stored on a virtual server manager 1102 or any other central virtual world server, where they might be subject to misuse or theft.

As mentioned above, User 1 and User 2 may create avatars of themselves and manipulate virtual objects in the virtual world. The avatars may be surrounded by personal spaces, and the overlap of personal spaces may be used to share information between users. In this example, User 1 has a personal space 1110 and User 2 has a personal space 1111. Additionally, a virtual object 1112 is within User 1's personal space. A personal space may be seen as an invisible or transparent object surrounding a user's avatar, for example. The attributes of a collision may be configurable. If an abstract collision detection shape exists surrounding the user's avatar representing a personal space (e.g., a virtual space collider), it can be used to detect overlap or intersection between two different personal spaces or virtual objects within a virtual world. When the spaces collide, certain actions may be triggered. Similarly, the physical interaction of the personal space collider with any object in the virtual world can be used to trigger one or more specified behaviors assigned to an object (switching on lights, showing data, opening doors, or executing a variety of backend system operations).

In this example, if User 2 moves personal space 1111 such that virtual object 1112 is within both users personal spaces, then a call may be triggered in the virtual server manager indicating that an interaction with virtual object 1112 has occurred. In this example, virtual server manager 1102 includes a request management software component 1121 and a credential management software component 1120. Credential management component 1120 may identify which clients currently sponsor credentials for which objects. For example, virtual server manager 1102 may associate particular virtual objects with particular client systems and or users, and this information may be stored and accessed when a particular object is activated by one or more personal spaces. Accordingly, a call generated in response to a user moving a personal space over an object in the personal space of another user may cause the credential component 1120 to access the client associated with the object. Request management component 1121 may forward requests to specified clients. In this example, request component 1121 may forward a request to a client output by credential component 1120, for example. Here, since User 2 moved personal space 1111 over object 1112 in personal space 1110, the credential component 1120 may produce client 1105, and therefore, request component 1121 forwards a request to client 1105.

Client 1105 may include a backend management software component 1130 to receive, execute, and route requests from virtual server manager 1102 to enterprise computer system 1114. As mentioned above, client 1105 includes credentials 1106. When a request is received from virtual server manager 1102, receipt and evaluation of the request causes client 1105 to access and send credentials 1106 to enterprise system 1114 with another request. As mentioned above, requests to backend systems may be to access particular data and/or perform functions or execute algorithms implemented by enterprise system 1114 (e.g., a database query on database 1117). The enterprise system 1114 uses the credentials to authenticate the request. If User 1 is authorized to access some or all of the data and/or functionality associated with the virtual object 1112 in the enterprise system 1114, where User 1's authorization is reflected and stored in the credentials, enterprise system 1114 authorizes the request and returns the desired results. Client 1105 further includes a server communications software component 1131. When enterprise system 1114 returns the desired results, server communication component 1131 routes the results to the virtual server manager 1102. Virtual server manager 1102 may include a object data management software component 1122. Object data management component 1122 may identify valid recipients of results from the backend request. For example, object data management component 1122 may identify client 1105 as one of the recipients of data associated with virtual object 1112 in response to User 2 moving personal space 1111 over object 1112 and triggering the data access request described above. Further, if both User 1 and User 2 need to be updated (e.g., if the two users are interactively accessing different data and functionality on enterprise computer system 1114 that is associated with object 1112), then both users may receive data updates. It is to be understood that data and functionality available only to User 2 on enterprise computer system 1114 may be shared with User 1 in a similar manner as described above. Accordingly, if two or more users share an object in a personal space, the data collected by each of the user's clients is sent to the managing server, which determines which updates need to be sent to which users. Hereby, again no credentials need to be known to the managing server instance.

Figure 12:
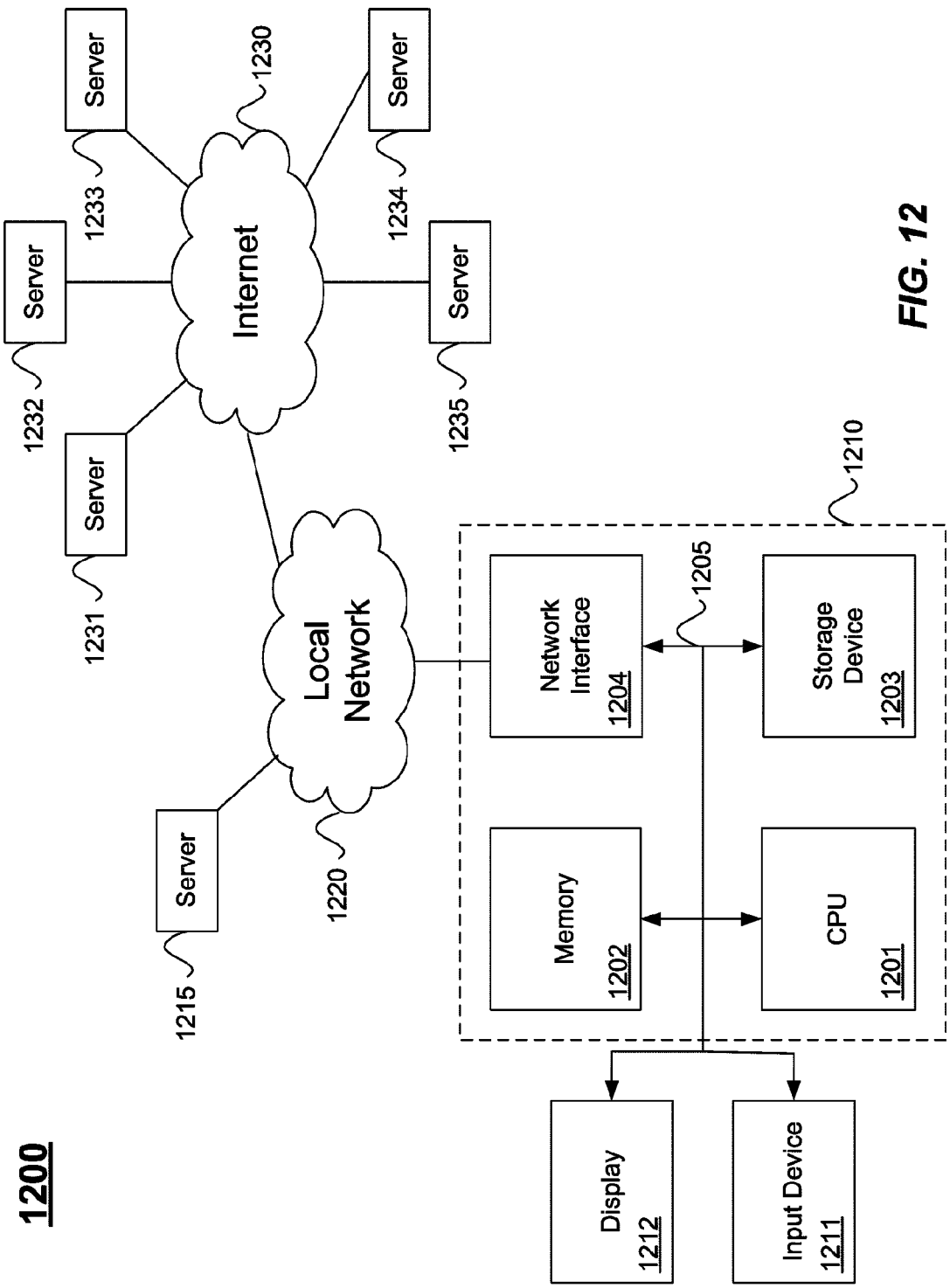
FIG. 12 illustrates a simplified diagram of a hardware system for implementing processes according to one embodiment of the present invention.

FIG. 12 illustrates a simplified diagram of a hardware system for implementing processes according to one embodiment of the present invention. Computer system 1210 includes one or more buses 1205 or other communication mechanism for communicating information, and one or more central processing units ("CPUs" or "processors") 1201 coupled with bus 1205 for processing information. The central processing unit may be configured to perform the functions described above and may be the means for performing the functions described above. Computer system 1210 also includes one or more memories 1202 coupled to bus 1205 for storing information and instructions to be executed by processors 1201, including information and instructions for performing the techniques described above, for example. This memory may also be used for storing variables or other intermediate information during execution of instructions to be executed by processor 1201. Possible implementations of this memory may be, but are not limited to, random access memory (RAM), read only memory (ROM), or both. A storage device 1203 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1203 may include source code, binary code, or software files for performing the techniques or embodying the constructs above, for example.

Computer system 1210 may be coupled via bus 1205 to an output device such as a display 1212, such as a cathode ray tube (CRT) or liquid crystal display (LCD), for displaying information to a computer user. An input device 1211 such as a keyboard and/or mouse is coupled to bus 1205 for communicating information and command selections from the user to processor 1201. The combination of these components allows the user to communicate with the system. In some systems, bus 1205 may be divided into multiple specialized buses.

Computer system 1210 also includes a network interface 1204 coupled with bus 1205. Network interface 1204 may provide two-way data communication between computer system 1210 and the local network 1220. The network interface 1204 may be a digital subscriber line (DSL) or a modem to provide data communication connection over a telephone line, for example. Another example of the network interface is a local area network (LAN) card to provide a data communication connection to a compatible LAN. Wireless links using radio frequency communications are another example. In any such implementation, network interface 1204 sends and receives electrical, electromagnetic, or optical signals that carry digital data streams representing various types of information.

Computer system 1210 can send and receive information, including messages or other interface actions, through the network interface 1204 to an Intranet or the Internet 1230. In the Internet example, software components or services may reside on multiple different computer systems 1210, 1215, or servers 1231-1235 across a local or wide area network such as the Internet. Some of the processes described above may be implemented on one or more servers, for example. A server 1231 may transmit actions or messages from one component, through Internet 1230, local network 1220, and network interface 1204 to a component on computer system 1210. Different processes may be implemented on any computer system and send and/or receive information across a network, for example. In one embodiment, the techniques describe above may be implemented by software executing on one or more client and server computers 1210, 1215, and 1231-1235, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Additionally, the terms used above are not to be construed as limiting the constructs encompassed by said terms except as expressly set forth in the claims. For example, while the present invention has used the term authorization rights above, it is to be understood that such term is equivalent to permissions, access rights, and other equivalent terms. Accordingly, the terminology used above may be interchangeable with other terminology and is further meant to be construed broadly and limited only by the express limitations set forth in the claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method of controlling access to information in a virtual computing environment comprising:
    storing authorization data on a first client computer system, wherein the authorization data comprises a public key certificate and an attribute certificate for a user of a plurality of users;
    accessing virtual computing software from the first client computer system;
    accessing a virtual object in the virtual computing software in response to instructions received from the first client computer system;
    sending the authorization data from the first client computer system to a second computer system, wherein the authorization data specifies access rights on the second computer system;
    accessing the second computer system using the authorization data and determining access rights to data related to accessing the virtual object on the second computer system based on said authorization data; and
    determining authorization rights in the virtual computing software based on the public key certificate and the attribute certificate of the user, wherein different attribute certificates are issued to different users based on a location of a virtual object in a hierarchically organized virtual space, and wherein the virtual object is located in the hierarchically organized virtual space, including:
        granting the user access to a first portion of the data according to the access rights of the user according to the authorization data, and
        denying the user access to the data other than the first portion according to the access rights of the user according to the authorization data.

2. The method of claim 1 wherein the authorization data is sent to the second computer system without being received by the virtual computing software.

3. The method of claim 1 wherein the authorization data is sent based on a first location of the virtual object and a second location of a virtual representation of a user in the virtual computing software.

4. The method of claim 3 wherein the authorization data is sent if the virtual object and the virtual representation of the user are both in a predefined space in the virtual computing software.

5. The method of claim 3 wherein the authorization data is sent if a personal space associated with the virtual representation of the user encompasses the virtual object in the virtual computing software.

6. The method of claim 1 wherein the authorization data is sent based on authorization rights for a user in the virtual computing software that are associated with a particular virtual space in the virtual computing software.

7. The method of claim 6 wherein the authorization data is sent if a virtual representation of the user has associated authorization rights in the virtual computing software to enter a particular virtual space and if the virtual object is in the particular virtual space.

8. The method of claim 6 wherein the authorization data is sent if authorization rights associated with a first personal space for a first virtual representation of the user allow a second virtual representation of a second user to enter the first personal space.

9. The method of claim 1 further comprising sending the attribute certificate to a certificate authority, wherein the certificate authority authorizes users to enter virtual spaces in the hierarchically organized virtual space to access virtual objects.

10. A non-transitory computer-readable medium containing instructions for controlling a computer system to execute processing comprising:
   storing authorization data on a first client computer system, wherein the authorization data comprises a public key certificate and an attribute certificate for a user of a plurality of users;
   accessing virtual computing software from the first client computer system;
   accessing a virtual object in the virtual computing software in response to instructions received from the first client computer system;
   sending the authorization data from the first client computer system to a second computer system, wherein the authorization data specifies access rights on the second computer system; and
   accessing the second computer system using the authorization data and determining access rights to data related to accessing the virtual object on the second computer system based on said authorization data; and
   determining authorization rights in the virtual computing software based on the public key certificate and the attribute certificate of the user, wherein different attribute certificates are issued to different users based on a location of a virtual object in a hierarchically organized virtual space, and wherein the virtual object is located in the hierarchically organized virtual space, including:
   granting the user access to a first portion of the data according to the access rights of the user according to the authorization data, and
   denying the user access to the data other than the first portion according to the access rights of the user according to the authorization data.

11. The non-transitory computer-readable medium of claim 10 wherein the authorization data is sent to the second computer system without being received by the virtual computing software.

12. The non-transitory computer-readable medium of claim 10 wherein the authorization data is sent based on a first location of the virtual object and a second location of a virtual representation of a user in the virtual computing software.

13. The non-transitory computer-readable medium of claim 12 wherein the authorization data is sent if the virtual object and the virtual representation of the user are both in a predefined virtual space in the virtual computing software.

14. The non-transitory computer-readable medium of claim 12 wherein the authorization data is sent if a personal space associated with the virtual representation of the user encompasses the virtual object in the virtual computing software.

15. The non-transitory computer-readable medium of claim 10 wherein the authorization data is sent based on authorization rights for a user in the virtual computing software that are associated with a particular virtual space in the virtual computing software.

16. The non-transitory computer-readable medium of claim 15 wherein the authorization data is sent if a virtual representation of the user has associated authorization rights in the virtual computing software to enter a particular virtual space and if the virtual object is in the particular virtual space.

17. The non-transitory computer-readable medium of claim 15 wherein the authorization data is sent if authorization rights associated with a first personal space for a first virtual representation of the user allow a second virtual representation of a second user to enter the first personal space.

18. The non-transitory computer-readable medium of claim 10 further comprising sending the attribute certificate to a certificate authority, wherein the certificate authority authorizes users to enter virtual spaces in the hierarchically organized virtual space to access virtual objects.

19. A system for controlling access to information in a virtual computing environment, comprising:
   a first client computer system that is configured to store authorization data and to communicate with a first computer system and a second computer system, wherein the authorization data comprises a public key certificate and an attribute certificate for a user of a plurality of users, wherein the first computer system is configured to execute virtual computing software to implement the virtual computing environment, and wherein the second computer system is configured to store data,
   wherein the first client computer system is further configured to access the virtual computing software, to access a virtual object in the virtual computing software, and to send the authorization data from the first client computer system to the second computer system, wherein the authorization data specifies access rights on the second computer system,
   wherein the first client computer system is further configured to access the second computer system using the authorization data, wherein the second computer system is configured to determine access rights to data related to accessing the virtual object on the second computer system based on said authorization data, wherein different attribute certificates are issued to different users based on a location of a virtual object in a hierarchically organized virtual space, and wherein the virtual object is located in the hierarchically organized virtual space,
   wherein the second computer system is configured to determine access rights including:

granting the user access to a first portion of the data according to the access rights of the user according to the authorization data, and denying the user access to the data other than the first portion according to the access rights of the user according to the authorization data.

* * * * *